US012153363B2

(12) United States Patent
Fujiwara

(10) Patent No.: US 12,153,363 B2
(45) Date of Patent: Nov. 26, 2024

(54) IMAGE FORMING APPARATUS WITH CONTROLLED WAVEFORM PATTERN

(71) Applicant: CANON KABUSHIKI KAISHA, Tokyo (JP)

(72) Inventor: Yuji Fujiwara, Boise, ID (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/304,173

(22) Filed: Apr. 20, 2023

(65) Prior Publication Data

US 2023/0341797 A1 Oct. 26, 2023

(30) Foreign Application Priority Data

Apr. 22, 2022 (JP) ................................ 2022-070535

(51) Int. Cl.
*G03G 15/20* (2006.01)
*G03G 15/00* (2006.01)

(52) U.S. Cl.
CPC ..... *G03G 15/2039* (2013.01); *G03G 15/2042* (2013.01); *G03G 15/80* (2013.01)

(58) Field of Classification Search
CPC ........... G03G 15/2039; G03G 15/2042; G03G 15/5004; G03G 15/80; G03G 2215/2035
See application file for complete search history.

(56) References Cited

U.S. PATENT DOCUMENTS 10,671,001 B2 * 6/2020 Shimura ............ G03G 15/2039
2011/0299868 A1 12/2011 Ito
2016/0327898 A1 * 11/2016 Fujiwara ............ G03G 15/2039
2017/0102650 A1 4/2017 Shimura
2021/0255569 A1 * 8/2021 Uekawa ............ G03G 15/2039

FOREIGN PATENT DOCUMENTS

EP 3276429 A1 1/2018
JP 2003123941 A 4/2003
JP 2011187238 A 9/2011
JP 2016138944 A 8/2016
JP 2016212256 A 12/2016

* cited by examiner

*Primary Examiner* — Sophia S Chen
(74) *Attorney, Agent, or Firm* — Canon U.S.A., Inc. IP Division

(57) ABSTRACT

A waveform pattern of an electric current running through a first heat generating group and a waveform pattern of an electric current of a second heat generating group, controlled by a control unit, in an image forming apparatus of the present invention are different from each other at at least one phase angle in one control period. The percentage of coincidence of a period of phase control of the first heat generating group and a period of phase control of the second heat generating group in the one control period is lower than or equal to 50%.

17 Claims, 9 Drawing Sheets

WAVE FORM PATTERNS THAT SATISFY RULE 1 AND RULE 2

IMAGE FORMING APPARATUS WITH CONTROLLED WAVEFORM PATTERN

BACKGROUND OF THE INVENTION

Field of the Invention

The present invention relates to an image forming apparatus, such as an electrophotographic printer or copier.

Description of the Related Art

To reduce higher harmonics or flicker generated by an electric current through a heat generating element in a fixing unit included in an image forming apparatus, the waveform pattern of the electric current through the heat generating element is controlled. Japanese Patent Application Laid-Open Publication No. 2003-123941 discusses a technique in which while phase control is performed on at least one half-wave in a control period of an integral multiple of one half-wave of a commercial frequency, wavenumber control is performed on the other half-waves, which are fully energized or not energized.

The technique discussed in Japanese Patent Application Laid-Open Publication No. 2003-123941 is an example of a measure taken in the image forming apparatus against higher harmonics in the image forming apparatus including the fixing unit provided with a single heat generating element.

SUMMARY OF THE INVENTION

The present invention is directed to controlling a waveform pattern at a fixing unit including at least two or three heat generating elements each driven by a corresponding switch element different from one another, the combined resistance of each heat generating element being different from one another, as measures effective against higher harmonics, flicker, and temperature ripple.

To solve the issues, according to an aspect of the present invention, an image forming apparatus includes an image forming unit configured to form a toner image on a recording material, a fixing unit configured to fix the toner image formed on the recording material to the recording material by heating, the fixing unit including a heater including at least three heat generating groups configured to generate heat by power supplied from an alternating current power source, at least three switch elements each provided on a path via which the power is supplied from the alternating current power source to a corresponding heat generating group of the at least three heat generating groups, and a control unit configured to control the power supplied to each of the at least three heat generating groups by controlling the at least three switch elements, the control unit controlling the power of every one control period consisting of a plurality of continuous cycles of an alternating current from the alternating current power source. The control unit is configured to switch a heat generation distribution in the heater in a longitudinal direction of the fixing unit. A combined resistance of a first heat generating group connected to a first switch element of the at least three switch elements is a smallest of combined resistances of the at least three heat generating groups, and a combined resistance of a second heat generating group connected to a second switch element of the at least three switch elements is a second smallest of the combined resistances of the at least three heat generating groups. A waveform pattern of an electric current running through the first heat generating group and a waveform pattern of an electric current running through the second heat generating group, controlled by the control unit, are different from each other at at least one same timing in the one control period. A percentage of concurrence of a period of phase control of the first heat generating group and a period of phase control of the second heat generating group in the one control period is lower than or equal to 50%.

According to another aspect of the present invention, an image forming apparatus includes an image forming unit configured to form a toner image on a recording material, a fixing unit configured to fix the toner image formed on the recording material to the recording material by heating, the fixing unit including a heater including at least two heat generating groups configured to generate heat by power supplied from an alternating current power source, at least two switch elements each provided on a path via which the power is supplied from the alternating current power source to a corresponding heat generating group of the at least two heat generating groups, and a control unit configured to control the power supplied to each of the at least two heat generating groups by controlling the at least two switch elements, the control unit controlling the power of every one control period consisting of a plurality of continuous cycles of an alternating current from the alternating current power source. The control unit is configured to switch a heat generation distribution in the heater in a longitudinal direction of the fixing unit. A combined resistance of a first heat generating group connected to a first switch element of the at least two switch elements is a smallest of combined resistances of the at least two heat generating groups, and a combined resistance of a second heat generating group connected to a second switch element of the at least two switch elements is a second smallest of the combined resistances of the at least two heat generating groups. A waveform pattern of an electric current running through the first heat generating group and a waveform pattern of an electric current running through the second heat generating group, controlled by the control unit, are different from each other at at least one same timing in the one control period. A percentage of concurrence of a period of phase control of the first heat generating group and a period of phase control of the second heat generating group in the one control period is lower than or equal to 50%. A percentage of the period of the phase control of the first heat generating group and a percentage of the period of the phase control of the second heat generating group are each more than 50% of the one control period, and a waveform pattern in wavenumber control runs through at least one cycle of the alternating current.

Further features of the present invention will become apparent from the following description of embodiments (with reference to the attached drawings).

DESCRIPTION OF THE EMBODIMENTS

Forms to implement the present invention will be illustratively described below with reference to the accompanying drawings based on embodiments. The dimension, materials, shapes, and relative positional relationships of the constituent elements of the embodiments can be modified as appropriate based on the configuration of an apparatus or various types of condition to which the present invention is applied. The embodiments described below do not limit the scope of the present invention.

Figure 1:
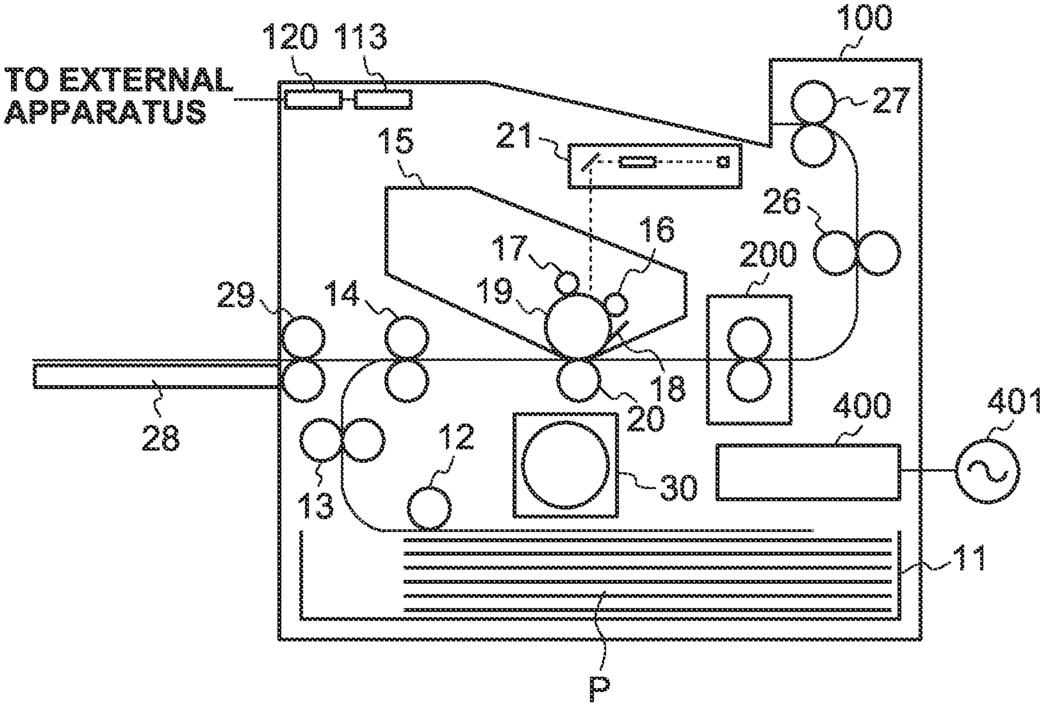
FIG. 1 is schematic view of an image forming apparatus.

FIG. 1 is a schematic cross-sectional view of an image forming apparatus 100 using electrophotographic recording techniques according to a first embodiment of the present invention. Examples of image forming apparatuses to which the present invention is applied include electrophotographic or electrostatic recording copiers and printers. A case will herein be described of a laser printer to which the present invention is applied and that forms images on recording sheets P as a recording material using an electrophotographic method.

The image forming apparatus 100 includes a video controller 120 and a control unit 113. The video controller 120 as an acquisition unit that acquires information about an image to be formed on a recording material performs processing on image information and print instructions received from an external apparatus, such as a personal computer. The control unit 113 is connected to the video controller 120, and performs the control of units included in image forming apparatus 100 based on instructions from the video controller 120. In response to when the video controller 120 receives a print instruction from the external apparatus, an image forming process is carried out through the following operation.

In response to when the image forming apparatus 100 receives a print signal, a scanner unit 21 emits laser light modulated based on the image information, and scans the surface of a photosensitive drum 19 with a predetermined polarity charged by a charging roller 16. This forms a latent electrostatic image on the surface of the photosensitive drum 19. A developing roller 17 supplies toner to the latent electrostatic image to form a toner image on the surface of the photosensitive drum 19. On the other hand, the recording material (recording sheets) P stacked on a sheet feeding cassette 11 is fed by a pick-up roller 12 one by one, and conveyed toward a registration roller pair 14 by a conveying roller pair 13. The recording material P is conveyed to a transfer position formed by the photosensitive drum 19 and a transfer roller 20 from the registration roller pair 14 in synchronization with the timing when the toner image on the photosensitive drum 19 reaches the transfer position. The toner image on the photosensitive drum 19 is transferred onto the recording material P while the recording material P passes through the transfer position. After that, the recording material P is heated at a fixing unit 200, by which the toner image is fixed to the recording material P. The recording material P with the fixed toner image is discharged onto a tray provided in the upper part of the image forming apparatus 100 by conveyance roller pairs 26 and 27. A drum cleaner 18 clears the photosensitive drum 19 of the remaining toner. A sheet feeding tray 28 (manual feed tray) provided with a recording material regulating plate pair that is adjustable in the width direction according to the size of the recording material P is attached to deal with recording materials of sizes other than the standard paper sizes. A pick-up roller 29 feeds the recording material P from the sheet feeding tray 28. The image forming apparatus 100 includes a motor 30 that drives the fixing unit 200 and other units.

A control circuit 400 as an electric power control unit connected to a commercial alternating current power source 401 supplies power to the fixing unit 200. The photosensitive drum 19, the charging roller 16, the scanner unit 21, the developing roller 17, and the transfer roller 20 constitute an image forming unit that forms an image to be fixed on the recording material P. In the present embodiment, the photosensitive drum 19, the charging roller 16, a developing unit including the developing roller 17, and a cleaning unit including the drum cleaner 18 constitute a process cartridge 15, which is removably installable into the main body of the image forming apparatus 100.

In addition, the fixing unit 200 is removably installable into the image forming apparatus 100.

Figure 2:
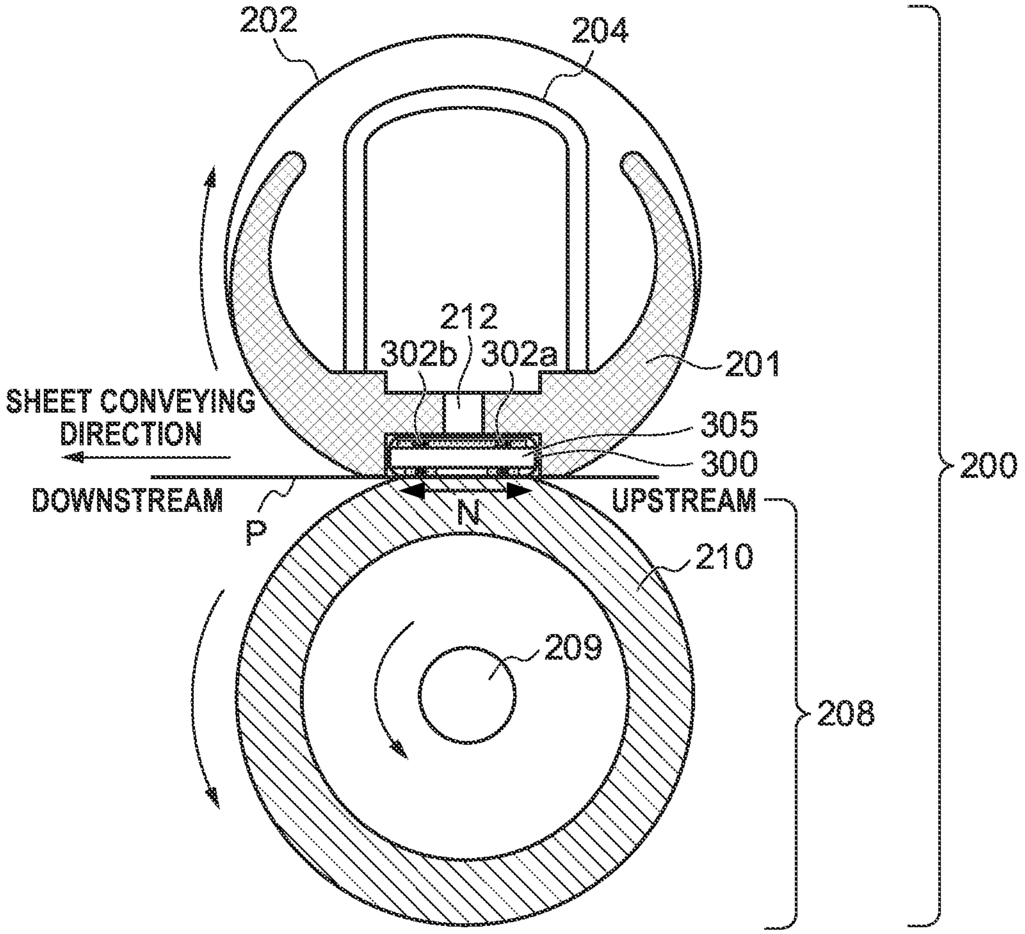
FIG. 2 is a cross-sectional view of a fixing unit.

FIG. 2 is a cross-sectional view of the fixing unit 200 according to the present embodiment. The fixing unit 200 includes a fixing film 202 in a pipe shape (hereinafter, referred to as a film), a heater 300 mounted in the internal space surrounded by the film 202, a pressure roller 208 that forms a fixing nip N with the heater 300 through the film 202, and a metal stay 204.

The film 202 is a heat-resistant film formed in a pipe shape, also called an endless belt or endless film. The material of the base layer is a heat-resistant resin, such as polyimide, or metal, such as stainless steel. An elastic layer that is, for example, a heat-resistant rubber can be provided on a surface of the film 202. The pressure roller 208 includes a core bar 209 made of, for example, iron or aluminum and an elastic layer 210 made of a silicone rubber by way of example. The heater 300 is held by a holding member 201 made of a heat-resistant resin. The holding member 201 also has a guiding function to guide the rotation of the film 202. The metal stay 204 is a metal stay to apply pressure generated by a spring not illustrated to the holding member 201.

The pressure roller 208 is rotated in the direction indicated by the arrow by power received from the motor 30. The rotation of the pressure roller 208 causes the film 202 to be driven by the pressure roller 208. The recording sheet P with the toner image to be fixed undergoes fixing process by being heated while the recording sheet P is being pinched and conveyed through the fixing nip N.

The heater 300 is heated by heat generating elements (heat generating resistors) 302*a* and 302*b* on a substrate 305 made of ceramic described below. A safety element 212 (FIG. 4) electrically connected to the heat generating elements 302*a*, 302*b* is in contact with the heater 300 (FIG. 2). Examples of the safety element 212 include a thermo-switch and a thermal fuse, which serve to shut off the power supplied to the heater 300 in response to overheat of the heater 300. In addition, a thermistor T1 (T1-1 to T1-4, and T1-7 in FIG. 3B) is provided on the side of the surface sliding with the film 202 of the heater 300.

Figure 3A:
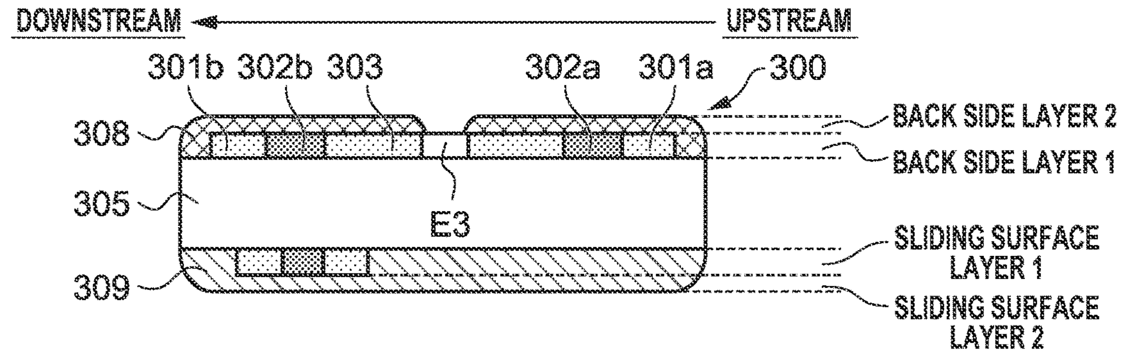
FIGS. 3A and 3B illustrate the configuration of a heater.
Figure 3B:
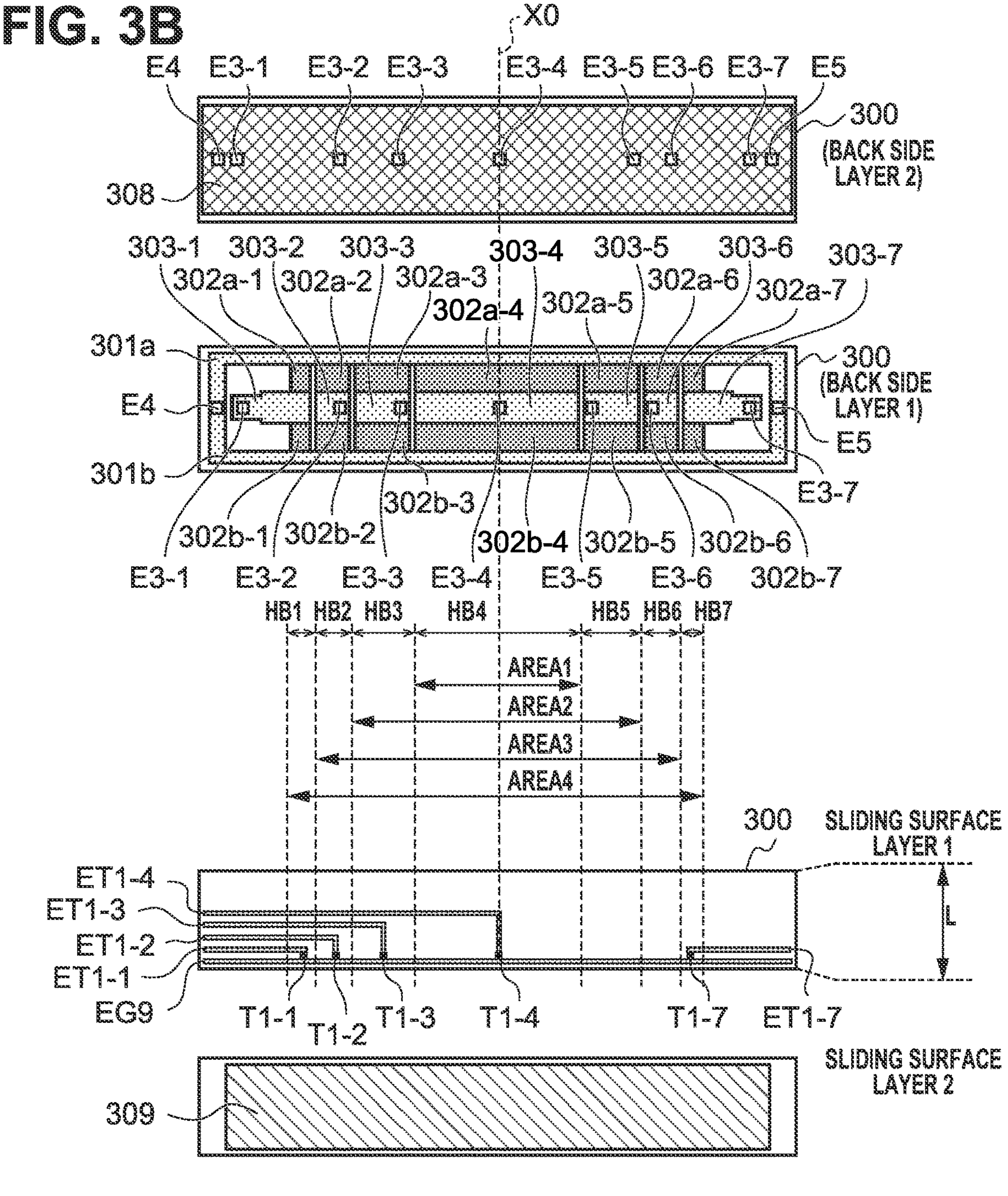

A configuration of the heater 300 according to the present embodiment will be described with reference to FIG. 3. FIG. 3A is a cross-sectional view of the heater 300, and FIG. 3B is a plan view of the layers of the heater 300. FIG. 3B illustrates a conveyance reference position X0 for the recording material P in the image forming apparatus 100 according to the present embodiment. The conveyance reference position X0 according to the present embodiment is a center reference. The recording material P is conveyed so that the center line in a direction orthogonal to the direction in which the recording material P is conveyed runs along the conveyance reference position X0. In addition, FIG. 3A is a cross-sectional view of the heater taken along the conveyance reference position X0.

As illustrated in FIG. 3A, the heater 300 includes electric conductors 301 and 303 on the substrate 305. The electric conductor 301 is divided into an electric conductor 301*a* arranged upstream of the heater 300 in the direction in which the recording material P is conveyed, and an electric conductor 301*b* arranged downstream of the heater 300 in the direction. In addition, the heater 300 includes a heat generating element 302 that is heated by the power supplied through the electric conductor 301 and the electric conductor 303 and is provided between the electric conductor 301 and the electric conductor 303 on the substrate 305. The heat generating element 302 is divided into the heat generating element 302*a* arranged upstream of the heater 300 in the direction in which the recording material P is conveyed, and the heat generating element 302*b* arranged downstream of the heater 300 in the direction. Further, an electrode E3 is arranged for power supply. A surface protective layer (protective glass) 308 as a back side layer 2 that is an electrical insulating material which covers a back side layer 1 except for the electrode E3. The heater 300 (substrate 305) is disposed such that its longitudinal direction is orthogonal to the direction in which the recording material P is conveyed.

As illustrated in FIG. 3B, seven heat generating blocks (HB1 to HB7), each of which consists of the electric conductor 301, the electric conductor 303, the heat generating element 302, and the electrode E3, are arranged in the back side layer 1 in the longitudinal direction of the heater 300. To illustrate correspondences with the seven heat generating blocks HB1 to HB7, the number representing each heat generating block is assigned to the end of the number of each element included in the heat generating block, like heat generating elements 302*a*-1 to 302*a*-7. The numbers are similarly given for the heat generating element 302*b*, the electric conductors 301*a* and 301*b*, and 303, and the electrode E3.

The surface protective layer 308 as the back side layer 2 of the heater 300 is formed such that electrode E3-1 to E3-7, E4, and E5 are exposed, allowing connection of electrodes not illustrated from the back side of the heater 300. This allows the supply and supply control of power to each heat generating block independently. The division into the seven heat generating blocks provides four sheet conveyance areas like AREA1 to AREA4. In the present embodiment, AREA1 is assigned to A5 sheets, AREA2 for B5 sheets, AREA3 for A4 sheets, and AREA4 for Letter sheets. As the seven individual heat generating blocks are able to be controlled independently, the heat generating block to be supplied power is selected according to the size of the recording sheet P. Further, in the present embodiment, five triacs (switch elements) in a circuit illustrated in FIG. 4 drive the seven heat generating blocks. The numbers of heat generating areas and heat generating blocks are not limited to the numbers in the present embodiment. Further, while the heat generating elements 302*a*-1 to 302*a*-7, and 302*b*-1 to 302*b*-7 are arranged in a continuous pattern, the arrangement pattern is not limited thereto. The heat generating elements may be arranged in a strip pattern with a gap between one heat generating element and another.

The thermistors T1-1 to T1-4, and T1-7 as temperature detecting elements each to detect the temperature of the corresponding heat generating block of the heater 300 are arranged in a sliding surface layer 1 of the heater 300 (on the surface of the substrate 305 opposite to the surface on which the heat generating elements are provided). The thermistors T1-1 to T1-4, and T1-7 are each disposed in the corresponding heat generating block to mainly control the temperature of the heat generating block. As will be described with reference to FIG. 4, the heat generating elements 302*a*-3, 302*b*-3 and the heat generating elements 302*a*-5, 302*b*-5 are electrically connected to each other, so that no temperature detecting element in a place corresponding to the heat generating block HB5 is disposed. Similarly, the heat generating elements 302*a*-2, 302*b*-2 and the heat generating elements 302*a*-6, 302*b*-6 are electrically connected to each other, so that no temperature detecting element in a place corresponding to the heat generating block HB6 is disposed. One ends of the thermistors T1-1 to T1-4, and T1-7 are each connected to the corresponding electric conductor of electric conductors ET1-1 to ET1-4, and ET1-7 for detection of resistance values of the thermistors, and the other ends are all connected to an electric conductor EG9.

A sliding surface layer 2 of the heater 300 includes a surface protective layer 309 that is a glass coating having slidability. The surface protective layer 309 is provided on the sliding surface layer 1 except for both ends of the heater 300 to arrange the electric contacts of the electric conductors in the sliding surface layer 1.

Figure 4:
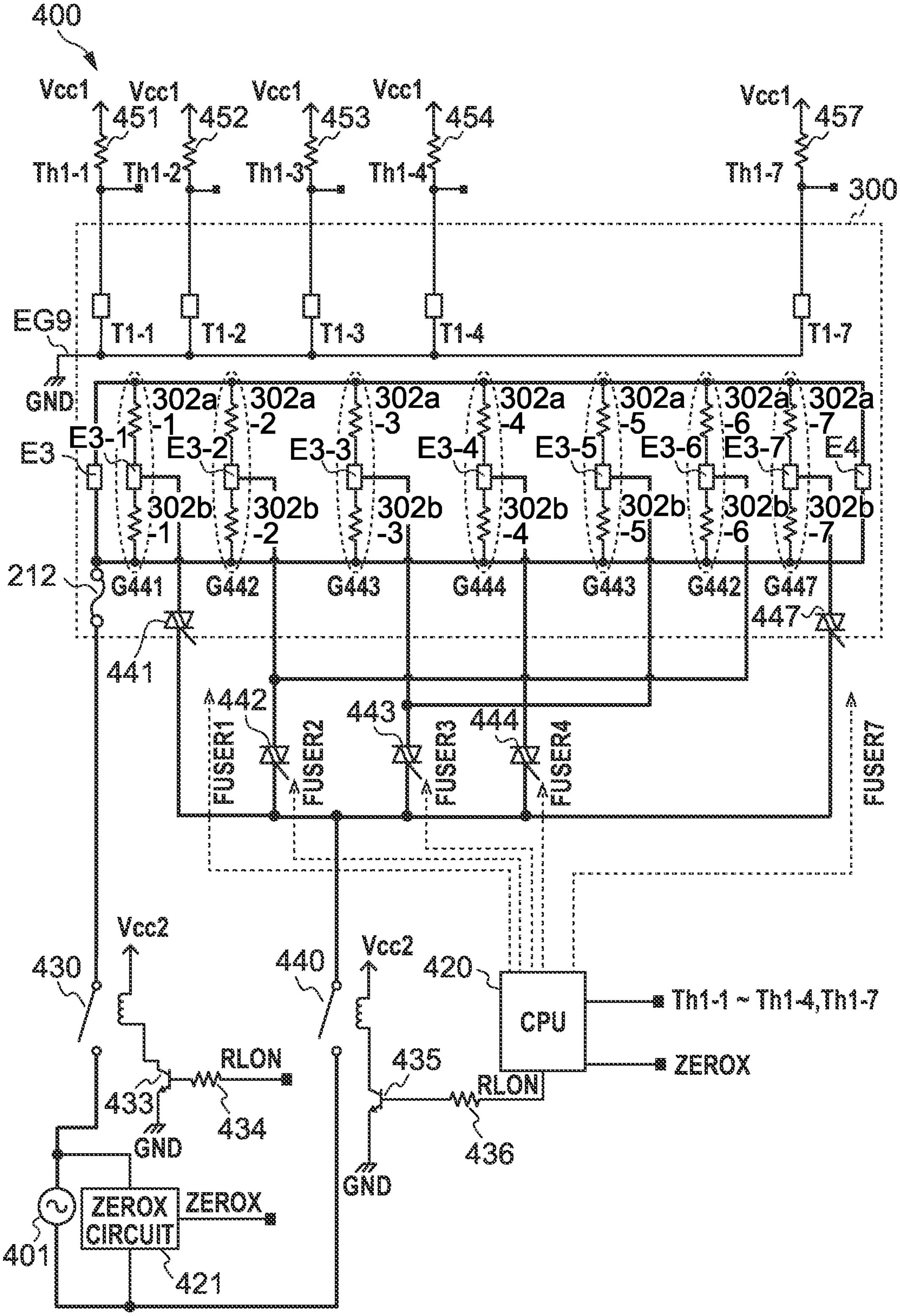
FIG. 4 illustrates a control circuit of the heater.

FIG. 4 is a circuit diagram illustrating the control circuit 400 of the heater 300 according to the first embodiment. The commercial alternating current power source 401 is connected to the image forming apparatus 100. Power-supply voltages Vcc1 and Vcc2 are direct-current (DC) power sources generated by an alternating-current (AC)-to-DC converter (not illustrated) connected to the alternating current power source 401. The alternating current power source 401 is connected to the heater 300 via relays 430 and 440 and triacs 441 to 444, and 447. The relays 430 and 440 are turned on/off by two control signals RLON from a central processing unit (CPU) 420. One signal is connected to a transistor 433 via a gate resistance 434 and the other signal is connected to a transistor 435 via a gate resistance 436. The triacs 441 to 444, and 447 are turned on/off by control signals FUSER1 to FUSER4, and FUSER7, respectively, from the CPU 420. Drive circuits for the triacs 441 to 444, and 447 are omitted in FIG. 4. The triacs 441 to 444, and 447 as a plurality of semiconductor elements are selectively controlled, allowing control of selective application of power to one or more heat generating elements from among the heat generating elements. This provides an individually selective heat generation operation on the heating areas divided in the longitudinal direction.

A temperature detecting circuit of the thermistors will now be described. The electric conductor EG9 is connected to the grounding potential.

Vcc1 is distributed between resistors 451 to 454, and 457 each pulled up to Vcc1 and the respective thermistors T1-1 to T1-4, and T1-7 described in FIG. 3. The voltages distributed among the resistors and the respective thermistors are detected as temperature signals Th1-1 to Th1-4, and Th1-7 by the CPU 420. The voltages are converted into temperatures with information previously set in internal memory of the CPU 420, allowing temperature detection.

The CPU 420 calculates power to be supplied, for example, using proportional-integral (PI) control, based on set temperatures (target temperatures) and detected temperatures of the thermistors T1-1 to T1-4, and T1-7. The CPU 420 generates timings of turning on the control signals FUSER1, FUSER2, FUSER3, FUSER4, and FUSER7 based on a timing signal ZEROX in synchronization with a zero potential of the alternating current power source 401 generated at a zero-crossing detector (ZEROX circuit) 421. As the heat generating elements 302*a*-3, 302*b*-3 and the heat generating elements 302*a*-5, 302*b*-5 are electrically connected to each other, the control signal FUSER3 can control power supplied to the heat generating elements 302*a*-3, 302*b*-3 and the heat generating elements 302*a*-5, 302*b*-5. Similarly, as the heat generating elements 302*a*-2, 302*b*-2 and the heat generating elements 302*a*-6, 302*b*-6 are electrically connected to each other, the control signal FUSER2 can control power supplied to the heat generating elements 302*a*-2, 302*b*-2 and the heat generating elements 302*a*-6, 302*b*-6. Further, the power values calculated by the CPU 420 are converted into duty ratios in Table 1, and the triacs 441 to 444, and 447 are controlled with phase angles (the control signals FUSER1, FUSER2, FUSER3, FUSER4, and FUSER7) each corresponding to a duty ratio. A table like Table 1 is set in the CPU 420. When phase control that supplies an electric current at a timing during a half cycle of an alternating current is performed, the control signals FUSER1, FUSER2, FUSER3, FUSER4, and FUSER7 are output based on the table. When wavenumber control that supplies or does not supply an electric current throughout a half cycle of an alternating current is performed, a binary control that performs energization for one full wave (duty ratio 100%) or an electric current interruption (duty ratio 0%) is performed.

TABLE 1

| Duty Ratio D (%) | Phase Angle α (°) |
|---|---|
| 100 | 0 |
| 97.5 | 28.56 |
| . | . |
| . | . |
| . | . |
| 75 | 66.17 |
| . | . |
| . | . |
| . | . |
| 50 | 90 |
| . | . |
| . | . |
| . | . |
| 60 | 80.93 |
| . | . |
| . | . |
| . | . |
| 25 | 113.83 |
| . | . |
| . | . |
| . | . |
| 2.5 | 151.44 |
| 0 | 180 |

Figure 5:
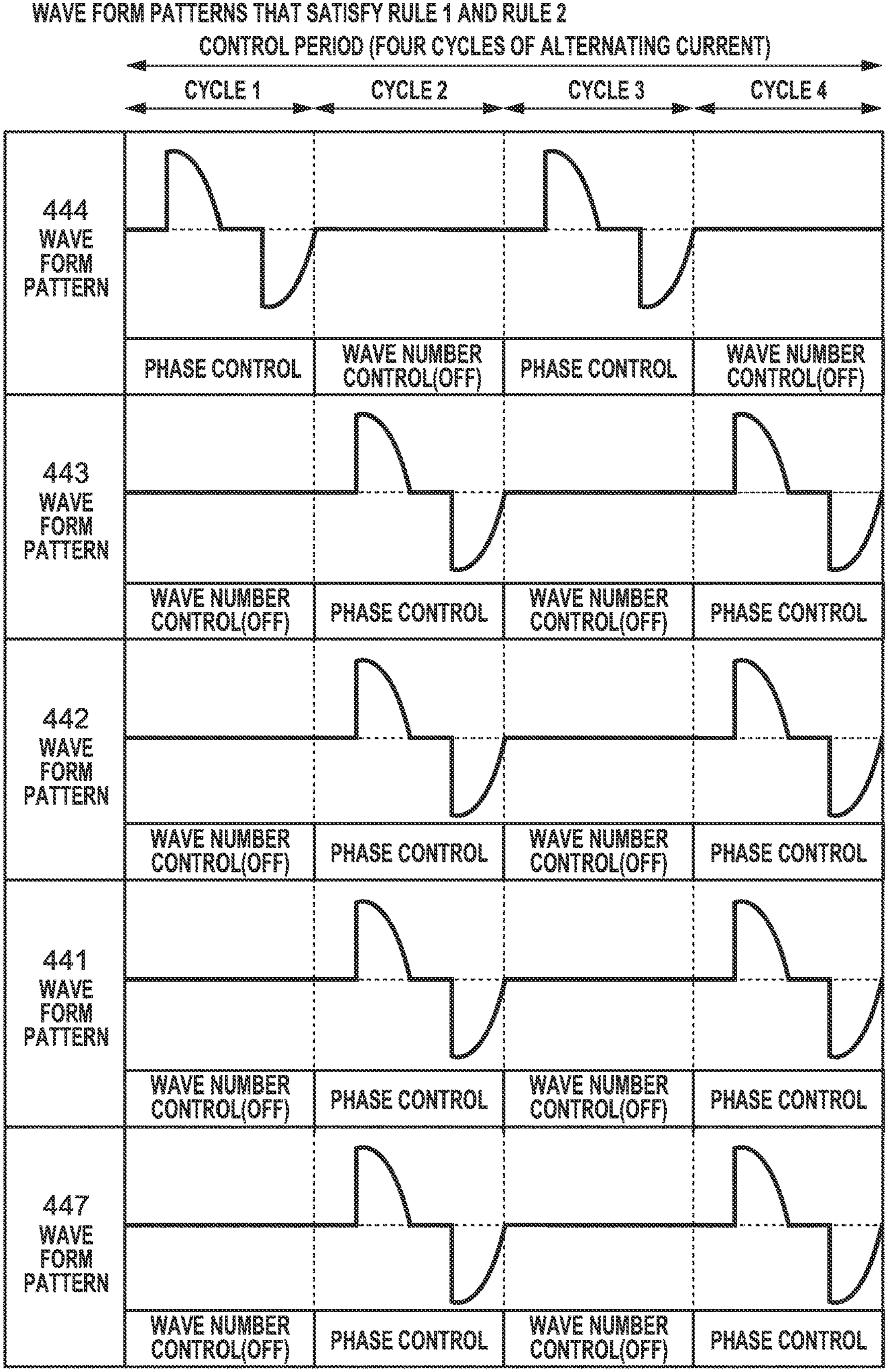
FIG. 5 is an illustrative diagram of waveform patters.
Figure 6A:
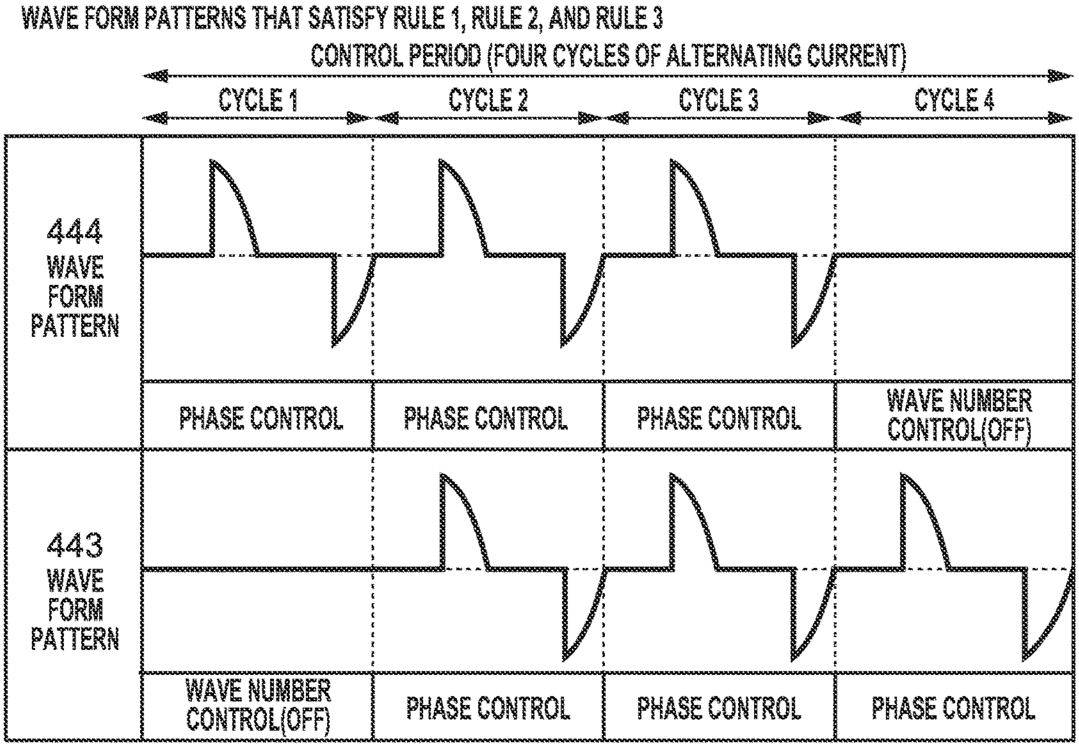
FIGS. 6A and 6B are illustrative diagrams of waveform patterns.
Figure 6B:
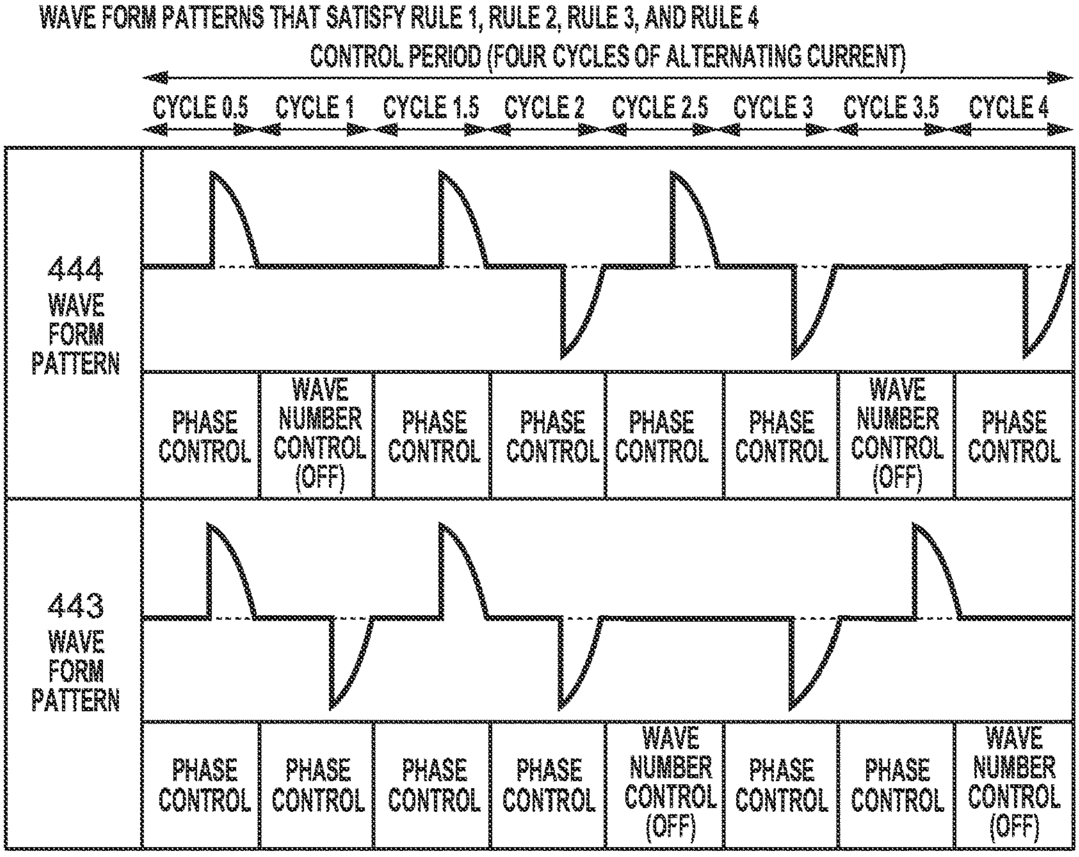

FIG. 5, FIG. 6A, and FIG. 6B illustrate waveform patterns of electric currents that run in the heater 300 when the CPU 420 feeds the control signals FUSER1, FUSER2, FUSER3, FUSER4, and FUSER7 to the triacs 441 to 444, and 447, respectively. The CPU 420 updates power supplied to the heater 300 every four cycles (four full waves) of commercial alternating current waveforms. Four cycles (four full waves) of the alternating current waveforms are defined as one update period (one control period).

As understood with reference to FIG. 5, waveform patterns of an electric current running through the heat generating element 302*a*-4 by driving the triac 444 (first switch element) based on the control signal FUSER4 are a waveform pattern in the phase control in Cycle 1 and Cycle 3. On the other hand, the waveform patterns in Cycle 2 and Cycle 4 are a waveform pattern in the wavenumber control (OFF in FIG. 5). Waveform patterns of an electric current running through the heat generating elements 302*a*-3, 302*b*-3 and 302*a*-5, 302*b*-5 by driving the triac 443 (second switch element) based on the control signal FUSER3 are a waveform pattern in the wavenumber control (OFF in FIG. 5) in Cycle 1 and Cycle 3. On the other hand, the waveform patterns in Cycle 2 and Cycle 4 are a waveform pattern in the phase control.

Here, the heat generating elements 302*a*-1, 302*b*-1 connected to the triac 441 is defined as a heat generating group G441, and the heat generating elements 302*a*-2, 302*b*-2 and 302*a*-6, 302*b*-6 connected to the triac 442 are defined as a heat generating group G442. In addition, the heat generating elements 302*a*-3, 302*b*-3 and 302*a*-5, 302*b*-5 connected to the triac 443 (second switch element) are defined as a heat generating group G443 (second heat generating group). The heat generating elements 302*a*-4, 302*b*-4 connected to the triac 444 (first switch element) is defined as a heat generating group G444 (first heat generating group). Further, the heat generating elements 302*a*-7, 302*b*-7 connected to the triac 447 is defined as a heat generating group G447. In comparison between combined resistances of the heat generating groups G441 to G444, and G447, the combined resistance of the heat generating group G444 is the smallest, and the combined resistance of the heat generating group G443 is the second smallest. A large electric current running through a heat generating group with a small combined resistance exacerbates higher harmonics, flicker, and temperature ripple.

For this reason, in the present embodiment, measures are taken on the relationship between the waveform patterns of electric currents running through the heat generating group G444 with the smallest combined resistance and through the heat generating group G443 with the second smallest combined resistance of the combined resistances of the five heat generating groups G441 to G444, and G447 as illustrated in FIG. 5. Specifically, waveform patterns are set such that the waveform of an electric current running through the heat generating group G444 and the waveform of an electric current running through the heat generating group G443 are different in waveform pattern from each other at at least one phase angle (timing) in one control period (Rule 1). Further, the other heat generating groups G441, G442, and G447 have larger combined resistances than the combined resistances of the heat generating groups G444 and G443, so that the heat generating groups G441, G442, and G447 have minor effects on higher harmonics, flicker, and temperature ripple. Waveform patterns used for the five heat generating groups G441 to G444, and G447 are simplified, so that two types of waveform pattern are used. Thus, the five heat generating groups G441 to G444, and G447 are divided into two large groups so that the difference between the sums of the combined resistances of the two large groups is a minimum. In the present embodiment, the heat generating group G444 belongs to a first large group, and the heat generating groups G441 to G443, and G447 belong to a second large group, to which the heat generating group G443 belongs. Thus, in the present embodiment, the waveform patterns of electric currents running through the heat generating groups G441, G442, and G447 are always identical to the waveform pattern of an electric current running through the heat generating group G443 (phase angles are also identical). As far as the heat generating group G444 with the smallest combined resistance and the heat generating group G443 with the second smallest combined resistance each belong to a different large group from each other, the other heat generating groups G441, G442, and G447 can belong to either of the two large groups. For example, the heat generating groups G441 and G447 may belong to the first large group to which the heat generating group G444 belongs, and the heat generating group G442 may belong to the second large group to which the heat generating group G443 belongs.

In addition, as illustrated in FIG. 5, the percentage of coincidence (occurrence at the same timing) of the phase control period of the heat generating group G444 and the phase control period of the heat generating group G443 in one control period is 50% or less (0% in FIG. 5) (Rule 2). This is because coincidence (occurrence at the same timing) of waveforms at the same phase in the phase control exacerbates higher harmonics, flicker, and temperature ripple.

FIGS. 6A and 6B illustrate waveform patterns of the heat generating groups G444 and G443. The waveform patterns of the other heat generating groups G441, G442, and G447 are identical to the waveform pattern of the heat generating group G443, and these are omitted. In FIG. 6A, the waveform pattern of an electric current running through the heat generating group G444 is a waveform pattern in the phase control in Cycle 1, Cycle 2, and Cycle 3 and is a waveform pattern in the wavenumber control (OFF) in Cycle 4. On the other hand, the waveform pattern of an electric current running through the heat generating group G443 is a waveform pattern in the phase control in Cycle 2, Cycle 3, and Cycle 4, and is a waveform pattern in the wavenumber control (OFF) in Cycle 1. Similarly to the waveform patterns in FIG. 5, Rule 1 and Rule 2 apply to the waveform patterns in FIG. 6A. As for Rule 2 in FIG. 6A, the percentage of coincidence of phase control periods is 50%. On the other hand, in FIG. 6A, each waveform pattern is a waveform pattern in the phase control in more than 50% of one control period. Specifically, the waveform pattern of an electric current running through the heat generating group G444 and the waveform pattern of an electric current running through the heat generating group G443 in the phase control periods both occupy ¾ of one control period. In addition, the wavenumber controls are each performed through at least one alternating current cycle. Thus, the percentage of the phase control periods in the waveform patterns of the example is more than 50%, and a waveform pattern in the wavenumber control appears through at least one alternating current cycle (Rule 3). Thus, the increase of the percentage of the phase control in one control period allows reduction of temperature ripple, and at least one alternating current cycle set for the wavenumber control allows reduction of higher harmonics.

FIG. 6B illustrates a waveform pattern of an electric current running through the heat generating group G444 in which waveform patterns in the phase control run in Cycle 0.5, Cycle 1.5, Cycle 2, Cycle 2.5, Cycle 3, and Cycle 4, and in FIG. 6B, a waveform pattern in the wavenumber control (OFF) runs in Cycle 1 and Cycle 3.5. On the other hand, a waveform pattern of an electric current running through the heat generating group G443 consists of waveform patterns in the phase control in Cycle 0.5, Cycle 1.0, Cycle 1.5, Cycle 2.0, Cycle 3, and Cycle 3.5 and a waveform pattern in the wavenumber control (OFF) in Cycle 2.5 and Cycle 4. Similarly to the waveform patterns in FIG. 6A, it is understood that Rule 1, Rule 2, and Rule 3 also apply to the waveform patterns in FIG. 6B. Further, the wavenumber control period for each heat generating group in FIG. 6B is divided into the two periods such that no divided period continues longer than a half cycle of an alternating current (Rule 4). Specifically, the waveform pattern of an electric current running through heat generating group G444 in the wavenumber control periods appears separately in Cycle 1 and Cycle 3.5. The waveform pattern of an electric current running through the heat generating group G443 in the wavenumber control periods appears separately in Cycle 2.5 and Cycle 4. Rule 4 allows further reduction of flicker.

The waveform patterns of electric currents running through the five heat generating groups G441 to G444, and G447 are waveform patterns that satisfy at least Rule 1 and Rule 2. The following is a summary of Rule 1, Rule 2, Rule 3, and Rule 4. Rule 1: A waveform pattern of an electric current running through a heat generating group with the smallest combined resistance (first heat generating group) and a waveform pattern of an electric current running through a heat generating group with the second smallest combined resistance (second heat generating group) are different from each other at at least one phase angle in one control period (Rule 1).

Rule 2: The percentage of coincidence of a phase control period of the first heat generating group and a phase control period of the second heat generating group in one control period is 50% or less (Rule 2).

Rule 3: The percentages of phase control periods of the first heat generating group and phase control periods of the second heat generating group are each more than 50% of one control period and a waveform pattern in the wavenumber control appears through at least one cycle of an alternating current (Rule 3).

Rule 4: In one control period, the periods of the wavenumber control of the first heat generating group and the second heat generating group are each divided such that no divided period continues longer than a half cycle of an alternating current (Rule 4).

Figure 7:
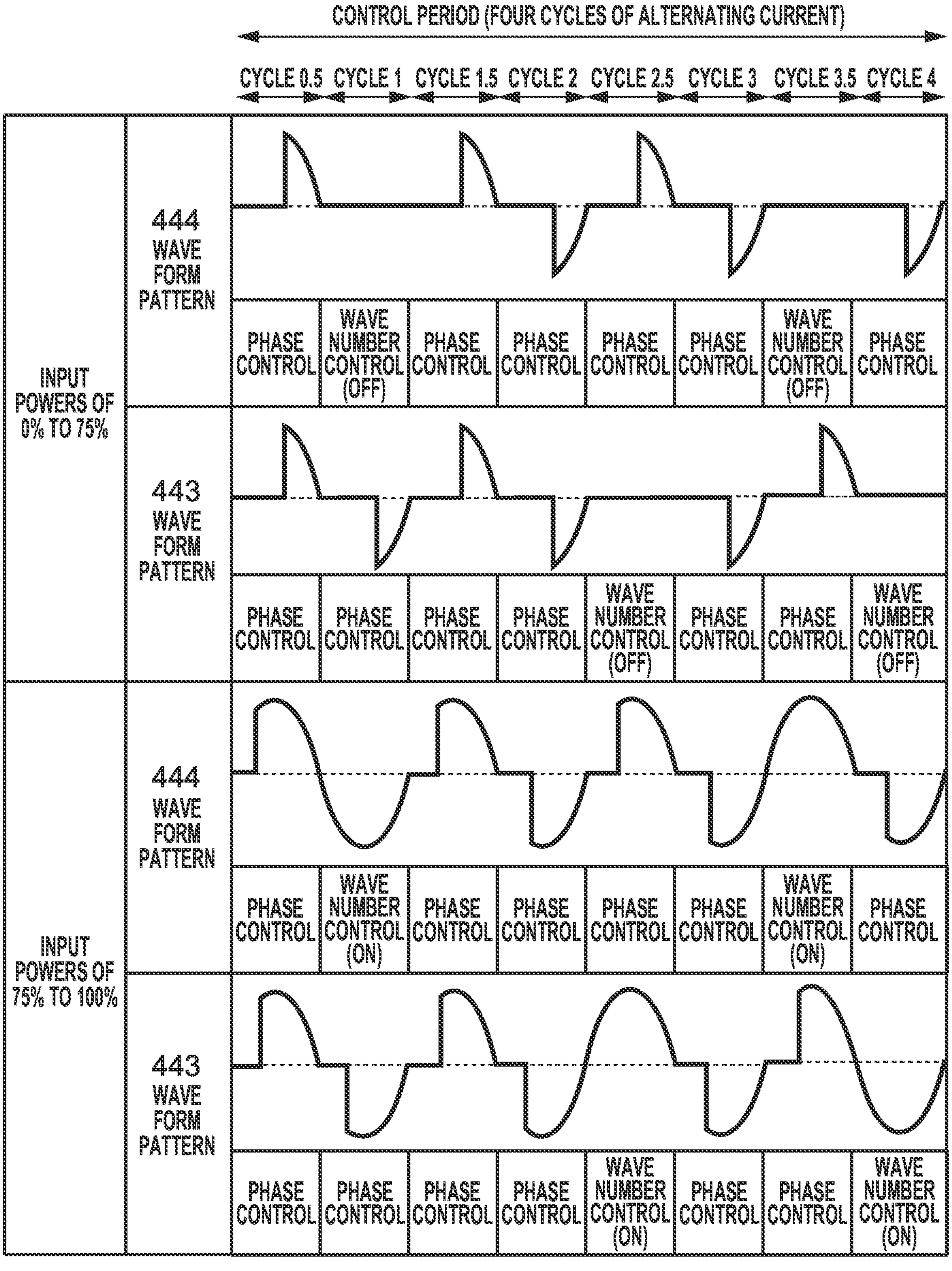
FIG. 7 is an overall view of waveform patterns according to a first embodiment.

FIG. 7 illustrates waveform patterns of electric currents running through the heat generating groups G444 and G443 at certain percentages of input power (input power level). Waveform patterns of electric currents running through the heat generating groups G441, G442, and G447 other than the heat generating groups G444 and G443 are either of the two waveform patterns, and the waveform patterns are omitted.

With input powers of 0% to 75%, the phase angle in each phase control is adjusted based on the input power using waveform patterns described with reference to FIG. 6B. With input powers of 75% to 100%, a power of 100% in the wavenumber control is input (ON), and each waveform pattern in the phase control is adjusted based on the power in a similar manner. The waveform patterns with input powers of 0% to 75% and input powers 75% to 100% in the examples in FIG. 7 each satisfy all the rules, that is, Rule 1, Rule 2, Rule 3, and Rule 4. With a heater including at least three heat generating groups driven by at least three switch elements as in the embodiment, it is desirable that at least Rule 1 and Rule 2 are satisfied. A waveform pattern that satisfies Rule 1, Rule 2, and Rule 3 is more desirable, and a waveform pattern that satisfies Rule 1, Rule 2, Rule 3, and Rule 4 is desirable the most.

Figure 8:
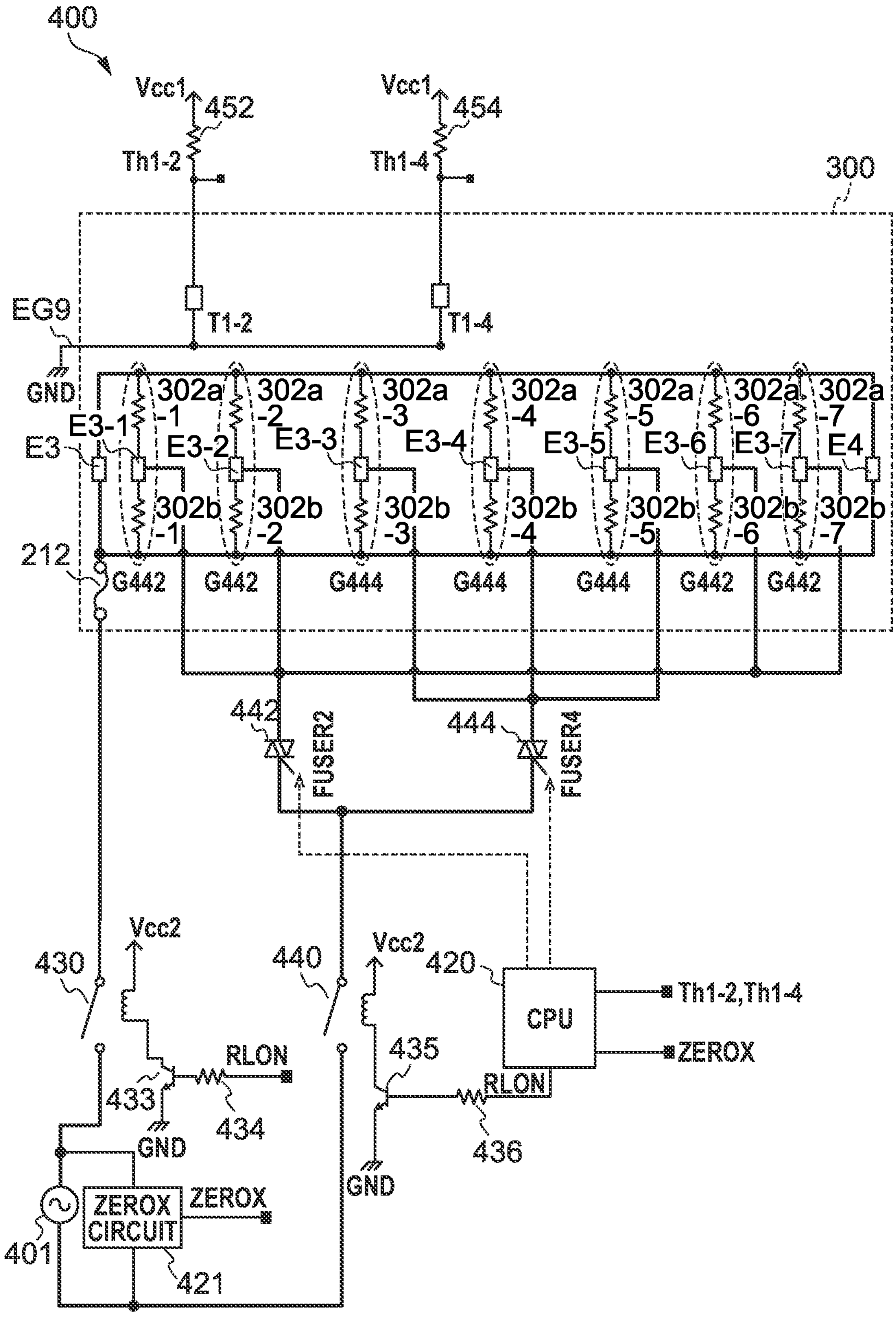
FIG. 8 is an example of a modification of the control circuit of the heater.

A modification will now be described with reference to FIG. 8. In the modification, a heater 300 only includes the two heat generating groups G442 and G444, where the combined resistance of the heat generating group G444<the combined resistance of the heat generating group G442. In this case, a waveform pattern that satisfies at least Rule 1, Rule 2, and Rule 3 is desirable. A waveform pattern that satisfies Rule 1, Rule 2, Rule 3, and Rule 4 is more desirable.

A selection of a waveform pattern that satisfies Rule 1 and Rule 2, Rule 1, Rule 2, and Rule 3, or Rule 1, Rule 2, Rule 3, and Rule 4 while input power is changed by PID control allows reduction of higher harmonics, flicker, and temperature ripple.

Figure 9:
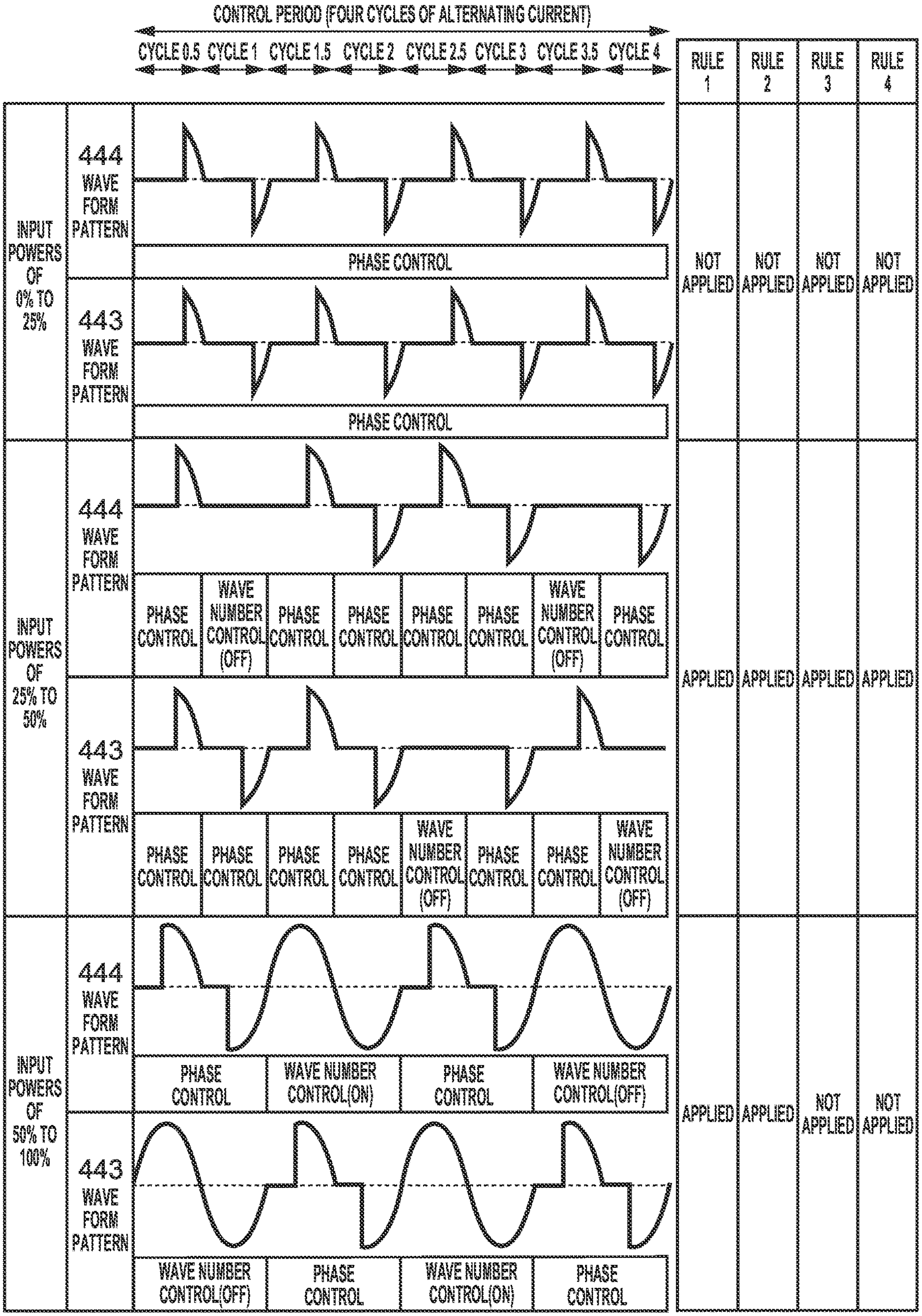
FIG. 9 is an overall view of waveform patterns according to a second embodiment.

A second embodiment will be described with reference to FIG. 9. FIG. 9 illustrates waveform patterns at input power percentages using the control circuit 400 of the heater 300 illustrated in FIG. 4 according to the present embodiment.

The present embodiment is different from the first embodiment in that Rule 1, Rule 2, Rule 3, and Rule 4 do not apply to some percentages of input power for the waveform patterns illustrated in FIG. 9.

With input powers of 0% to 25%, the phase control is selected throughout one control period. Whereas this waveform pattern is disadvantageous in that higher harmonics noise is produced, this waveform pattern is advantageous in terms of temperature ripple and flicker. Higher voltages of the commercial alternating current power source increases the power applied to a heat generating element, which results in a smaller percentage of input power for supplying a predetermined power in temperature control. This also increases the power in one cycle of the alternating current, making temperature ripple likely to occur. Thus, the selection of the phase control for a waveform pattern with low input power percentages of 0% to 25% allows reduction of temperature ripple.

With input powers of 25% to 50%, waveform patterns to which Rule 1, Rule 2, Rule 3, and Rule 4 described in the first embodiment all apply are selected.

With input powers of 50% to 100%, the waveform patterns to which Rule 1 and Rule 2 from among Rule 1, Rule 2, Rule 3, and Rule 4 described in the first y embodiment apply. While the waveform patterns are disadvantageous in temperature ripple, the waveform patterns are advantageous in terms of higher harmonics and flicker. The temperature at the heater 300 is controlled to stay at a target temperature. When power is supplied to the heat generating element, the temperature at the heater 300 gradually increases to a maximum, and the power supplied to the heat generating element settles at a level lower than a certain power. Large percentages of input power such as 50% to 100% are mainly used in a warm-up period before the temperature at the heater 300 reaches a maximum, and the waveform patterns that are advantageous in terms of flicker are selected.

As described above, Rule 1, Rule 2, Rule 3, and/or Rule 4 may be selected depending on which of higher harmonics reduction, flicker reduction, and temperature ripple reduction is treated as important while the percentage of input power is changed by PI control.

Lastly, the following is a summary of representative configurations. Numbers added to elements in the following configuration examples refer to corresponding elements described in the embodiments above. The correspondence relationships are merely examples for reference, and each element described below is not limited to the configuration of the corresponding element in the embodiments described above.

Configuration Example A1

An image forming apparatus includes an image forming unit configured to form a toner image on a recording material, a fixing unit configured to fix the toner image formed on the recording material to the recording material by heating, the fixing unit including a heater including at least three heat generating groups configured to generate heat by power supplied from an alternating current power source, at least three switch elements each provided on a path via which the power is supplied from the alternating current power source to a corresponding heat generating group of the at least three heat generating groups, and a control unit configured to control the power supplied to each of the at least three heat generating groups by controlling the at least three switch elements, the control unit controlling the power of every one control period consisting of a plurality of continuous cycles of an alternating current from the alternating current power source. The image forming apparatus is configured to switch a heat generation distribution in the heater in the longitudinal direction of the fixing unit. The combined resistance of a first heat generating group connected to a first switch element of the at least three switch elements is the smallest of the combined resistances of the at least three heat generating groups, and the combined resistance of a second heat generating group connected to a second switch element of the at least three switch elements is the second smallest of the combined resistances of the at least three heat generating groups. A waveform pattern of an electric current running through the first heat generating group and a waveform pattern of an electric current running through the second heat generating group controlled by the control unit are different from each other at at least one same timing in the one control period. The percentage of coincidence of the period of phase control of the first heat generating group and the period of phase control of the second heat generating group in the one control period is lower than or equal to 50%.

Configuration Example A2

In the image forming apparatus according to Configuration Example A1, in the waveform pattern controlled by the control unit, a percentage of the period of the phase control to the period of the one control period is higher than 50% for both the first heat generating group and the second heat generating group, and at least the period of one cycle of alternating current is the wavenumber control pattern.

Configuration Example A3

In the image forming apparatus according to Configuration Example A2, in the waveform pattern controlled by the control unit, the period of the wavenumber control for the first heat generating group and the period of the wavenumber control for the second heat generating group are each divided such that no divided period continues longer than a half cycle of the alternating current.

Configuration Example A4

In the image forming apparatus according to any one of Configuration Examples A1 to A3, out of the at least three heat generating groups, a waveform pattern of an electric current of at least one heat generating group other than the first heat generating group and the second heat generating group is identical to any one of the waveform pattern of the electric current running through the first heat generating group and the waveform pattern of the electric current running through the second heat generating group.

Configuration Example A5

In the image forming apparatus according to Configuration Example A4, the at least one heat generating group other than the first heat generating group and the second heat generating group belongs to any one of a first large group to which the first heat generating group belongs and a second large group to which the second heat generating group belongs such that a difference between the combined resistance of the first large group and the combined resistance of the second large group is smallest.

Configuration Example A6

In the image forming apparatus according to any one of Configuration Examples A1 to A3, the waveform pattern of the electric current running through the first heat generating group and the waveform pattern of the electric current running through the second heat generating group, controlled by the control unit, are each set at a level lower than or equal to a predetermined level of input power.

Configuration Example A7

In the image forming apparatus according to any one of Configuration Examples A1 to A3, the heater includes a substrate provided with the at least three heat generating groups.

Configuration Example A8

In the image forming apparatus according to Configuration Example A7, the at least three heat generating groups are arranged in the longitudinal direction.

Configuration Example A9

In the image forming apparatus according to Configuration Example A8, the at least three heat generating groups each include two electric conductors arranged in the longitudinal direction and a heat generating element connected between the two electric conductors.

Configuration Example A10

In the image forming apparatus according to Configuration Example A9, the fixing unit includes a film in a pipe shape and a roller in contact with the periphery of the film. The heater is disposed in the internal space surrounded by the film. The heater and the roller sandwich the film, and form a fixing nip through which the recording material is pinched and conveyed between the film and the roller.

Configuration Example B1

An image forming apparatus includes an image forming unit configured to form a toner image on a recording material, a fixing unit configured to fix the toner image formed on the recording material to the recording material by heating, the fixing unit including a heater including at least two heat generating groups configured to generate heat by power supplied from an alternating current power source, at least two switch elements each provided on a path via which the power is supplied from the alternating current power source to a corresponding heat generating group of the at least two heat generating groups, and a control unit configured to control the power supplied to each of the at least two heat generating groups by controlling the at least two switch elements, the control unit controlling the power of every one control period consisting of a plurality of continuous cycles of an alternating current from the alternating current power source. The image forming apparatus is configured to switch a heat generation distribution in the heater in the longitudinal direction of the fixing unit. The combined resistance of a first heat generating group connected to a first switch element of the at least two switch elements is the smallest of the combined resistances of the at least two heat generating groups, and the combined resistance of a second heat generating group connected to a second switch element of the at least two switch elements is the second smallest of the combined resistances of the at least two heat generating groups. A waveform pattern of an electric current running through the first heat generating group and a waveform pattern of an electric current running through the second heat generating group, controlled by the control unit, are different from each other at at least one phase angle in the one control period. The percentage of coincidence of the period of phase control of the first heat generating group and the period of phase control of the second heat generating group in the one control period is lower than or equal to 50%. The percentage of the period of the phase control of the first heat generating group and the percentage of the period of the phase control of the second heat generating group are each more than 50% of the one control period, and a waveform pattern in wavenumber control appears through at least one cycle of the alternating current.

Configuration Example B2

In the image forming apparatus according to Configuration Example B1, in the one control period, the period of the waveform pattern controlled by the control unit in the wavenumber control of the first heat generating group and the period of the waveform pattern controlled by the control unit in the wavenumber control of the second heat generating group are each divided such that no divided period continues longer than a half cycle of the alternating current.

Configuration Example B3

In the image forming apparatus according to Configuration Example B1 or B2, the heater includes at least one heat generating group other than the first heat generating group and the second heat generating group. A waveform pattern of an electric current running through the at least one heat generating group other than the first heat generating group and the second heat generating group is identical to any one of the waveform pattern of the electric current running through the first heat generating group and the waveform pattern of the electric current running through the second heat generating group.

Configuration Example B4

In the image forming apparatus according to Configuration Example B1 or B2, the waveform pattern of the electric current running through the first heat generating group and the waveform pattern of the electric current running through the second heat generating group, controlled by the control unit, are each set at a level lower than or equal to a predetermined level of input power.

Configuration Example B5

In the image forming apparatus according to Configuration Example B1 or B2, the heater includes a substrate provided with the at least two heat generating groups.

Configuration Example B6

In the image forming apparatus according to Configuration Example B5, the at least two heat generating groups are arranged in the longitudinal direction.

Configuration Example B7

In the image forming apparatus according to Configuration Example B6, the at least two heat generating groups each include two electric conductors arranged in the longitudinal direction and a heat generating element connected between the two electric conductors.

Configuration Example B8

In the image forming apparatus according to Configuration Example B7, the fixing unit includes a film in a pipe shape and a roller in contact with the periphery of the film. The heater is disposed in the internal space surrounded by the film. The heater and the roller sandwich the film, and form a fixing nip through which the recording material is pinched and conveyed between the film and the roller.

While the present invention has been described with reference to embodiments, it is to be understood that the invention is not limited to the disclosed embodiments, but is defined by the scope of the following claims.

This application claims the benefit of Japanese Patent Application No. 2022-070535, filed Apr. 22, 2022, which is hereby incorporated by reference herein in its entirety.

What is claimed is:

1. An image forming apparatus comprising:

an image forming unit configured to form a toner image on a recording material;

a fixing unit configured to fix the toner image formed on the recording material to the recording material by heating, the fixing unit including a heater including at least three heat generating groups configured to generate heat by power supplied from an alternating current power source;

at least three switch elements each provided on a path via which the power is supplied from the alternating current power source to a corresponding heat generating group of the at least three heat generating groups; and a control unit configured to control the power supplied to each of the at least three heat generating groups by controlling the at least three switch elements, the control unit controlling the power of every one control period consisting of a plurality of continuous cycles of an alternating current from the alternating current power source, wherein the control unit is configured to switch a heat generation distribution in the heater in a longitudinal direction of the fixing unit, wherein a combined resistance of a first heat generating group connected to a first switch element of the at least three switch elements is a smallest of combined resistances of the at least three heat generating groups, and a combined resistance of a second heat generating group connected to a second switch element of the at least three switch elements is a second smallest of the combined resistances of the at least three heat generating groups, wherein a waveform pattern of an electric current running through the first heat generating group and a waveform pattern of an electric current running through the second heat generating group, controlled by the control unit, are different from each other at at least one same timing in the one control period, and wherein a percentage of coincidence of a period of phase control of the first heat generating group and a period of phase control of the second heat generating group in the one control period is lower than or equal to 50%.

2. The image forming apparatus according to claim 1, wherein in both the first heat generating group and the second heat generating group, a percentage of the period of the phase control to a period of the one control period is higher than 50%, and at least a period of one cycle of the alternating current is a wavenumber control pattern.

3. The image forming apparatus according to claim 2, wherein, in both the first heat generating group and the second heat generating group, periods of wavenumber control are dispersed in the one control period so that the period of the wavenumber control is not longer than a period of a half cycle of the alternating current.

4. The image forming apparatus according to claim 1, wherein, out of the at least three heat generating groups, a waveform pattern of an electric current of at least one heat generating group other than the first heat generating group and the second heat generating group is identical to any one of the waveform pattern of the electric current running through the first heat generating group and the waveform pattern of the electric current running through the second heat generating group.

5. The image forming apparatus according to claim 4, wherein the at least one heat generating group other than the first heat generating group and the second heat generating group belongs to any one of a first large group to which the first heat generating group belongs and a second large group to which the second heat generating group belongs such that a difference between a combined resistance of the first large group and a combined resistance of the second large group is smallest.

6. The image forming apparatus according to claim 1, wherein the waveform pattern of the electric current running through the first heat generating group and the waveform pattern of the electric current running through the second heat generating group, controlled by the control unit, are each set at a level lower than or equal to a predetermined level of input power.

7. The image forming apparatus according to claim 1, wherein the heater includes a substrate provided with the at least three heat generating groups.

8. The image forming apparatus according to claim 7, wherein the at least three heat generating groups are arranged in the longitudinal direction.

9. The image forming apparatus according to claim 8, wherein the at least three heat generating groups each include two electric conductors arranged in the longitudinal direction and a heat generating element connected between the two electric conductors.

10. The image forming apparatus according to claim 9, wherein the fixing unit includes a film in a pipe shape and a roller in contact with a periphery of the film, wherein the heater is disposed in an internal space surrounded by the film, and wherein the heater and the roller sandwich the film, and form a fixing nip through which the recording material is pinched and conveyed between the film and the roller.

11. An image forming apparatus comprising:

an image forming unit configured to form a toner image on a recording material;

a fixing unit configured to fix the toner image formed on the recording material to the recording material by heating, the fixing unit including a heater including at least two heat generating groups configured to generate heat by power supplied from an alternating current power source;

at least two switch elements each provided on a path via which the power is supplied from the alternating current power source to a corresponding heat generating group of the at least two heat generating groups; and a control unit configured to control the power supplied to each of the at least two heat generating groups by controlling the at least two switch elements, the control unit controlling the power of every one control period consisting of a plurality of continuous cycles of an alternating current from the alternating current power source, wherein the control unit is configured to switch a heat generation distribution in the heater in a longitudinal direction of the fixing unit, wherein a combined resistance of a first heat generating group connected to a first switch element of the at least two switch elements is a smallest of combined resistances of the at least two heat generating groups, and a combined resistance of a second heat generating group connected to a second switch element of the at least two switch elements is a second smallest of the combined resistances of the at least two heat generating groups, wherein a waveform pattern of an electric current running through the first heat generating group and a waveform pattern of an electric current running through the second heat generating group, controlled by the control unit, are different from each other at at least one same timing in the one control period, wherein a percentage of coincidence of a period of phase control of the first heat generating group and a period of phase control of the second heat generating group in the one control period is lower than or equal to 50%, wherein a percentage of the period of the phase control of the first heat generating group and a percentage of the period of the phase control of the second heat generating group are each more than 50% of the one control period, and a waveform pattern in wavenumber control appears through at least one cycle of the alternating current, wherein the heater includes at least one heat generating group other than the first heat generating group and the second heat generating group, and wherein a waveform pattern of an electric current running through the at least one heat generating group other than the first heat generating group and the second heat generating group is identical to any one of the waveform pattern of the electric current running through the first heat generating group and the waveform pattern of the electric current running through the second heat generating group.

12. The image forming apparatus according to claim 11, wherein, in both the first heat generating group and the second heat generating group, periods of the wavenumber control are dispersed in the one control period so that the period of the wavenumber control is not longer than a period of a half cycle of the alternating current.

13. The image forming apparatus according to claim 11, wherein the waveform pattern of the electric current running through the first heat generating group and the waveform pattern of the electric current running through the second heat generating group, controlled by the control unit, are each set at a level lower than or equal to a predetermined level of input power.

14. The image forming apparatus according to claim 11, wherein the heater includes a substrate provided with the at least two heat generating groups.

15. The image forming apparatus according to claim 14, wherein the at least two heat generating groups are arranged in the longitudinal direction.

16. The image forming apparatus according to claim 15, wherein the at least two heat generating groups each include two electric conductors arranged in the longitudinal direction and a heat generating element connected between the two electric conductors.

17. The image forming apparatus according to claim 16, wherein the fixing unit includes a film in a pipe shape and a roller in contact with a periphery of the film, wherein the heater is disposed in an internal space surrounded by the film, and wherein the heater and the roller sandwich the film, and form a fixing nip through which the recording material is pinched and conveyed between the film and the roller.

* * * * *